UNITED STATES PATENT OFFICE.

WILLIAM C. WETHERILL, OF JOPLIN, MISSOURI.

REDUCTION OF COMPLEX ORES.

SPECIFICATION forming part of Letters Patent No. 484,269, dated October 11, 1892.

Application filed June 28, 1892. Serial No. 438,465. (No specimens.)

*To all whom it may concern:*

Be it known that I, WILLIAM C. WETHERILL, a citizen of the United States, residing at Joplin, in Jasper county, State of Missouri, have invented a new and useful Improvement in the Reduction of Complex Ores, of which invention the following is a specification.

My invention relates to the treatment of ores containing lead, silver, and gold, or either of these metals, in association with zinc when the last-named metal is present in such large amount as to render the furnace-treatment hitherto pursued impracticable.

When an ore containing silver and gold in association with zinc is charged into the regular smelting-furnace, part of the zinc is driven off as metallic fumes. These fumes combine with oxygen to form oxide of zinc, which collects on the sides of the furnace and endangers the free feeding of the charge from the top of the furnace. This volatilization of zinc carries a considerable amount of silver and some gold away with it. Again, the remaining zinc acts to stiffen the slag, and thus becomes a further obstacle to the ordinary treatment. For these reasons smelters treating silver and gold ores stipulate that should the ores contain more than ten per cent. of zinc an additional charge of fifty cents for each one per cent. of zinc in excess of the ten per cent. shall be added to the regular treatment charges. Such being the universal practice, it is evident that an ore running low in silver and gold and high in zinc is unable to find a market, and the result is that thousands of tons of such ores are left in the mines or thrown on the waste-banks.

My invention consists of a method of treating the complex ores above mentioned whereby there is removed therefrom and saved a sufficient amount of the zinc to permit the treatment of the remaining products in the ordinary way.

If the ores contain sulphur in any form they should first be crushed and calcined. When slagging results from calcination, the slag should be crushed fine enough to press through a ten-mesh screen. If the ores are practically free of sulphur, the first step in the treatment is to crush them to the degree of fineness above mentioned. The crushed ores are then mixed with carbon in the form of coal or coke, or both, the fuel having been crushed to a size little if any in excess of that of the ores. The proportion of fuel to the ores varies with the character of the ores to be treated. With ores high in lead it is well to mix the ores and the fuel in equal parts by weight, while the ores containing little or no lead, fuel equal to fifty per cent. of the ores by weight will be sufficient. The charge so prepared is then treated in the Wetherill furnace just as zinc ores are now treated therein for the production of zinc-white, and the volatile products collected in bags or in compartments in the usual way. The cinder or slag remaining upon the grate-bars after the charge has been worked off contains zinc in an amount not exceeding ten per cent. of the mass, and is found to have retained from twenty-five to fifty per cent. of the silver and almost all of the gold contained in the original charge. If the original ore contained lead, some lead will also remain in the cinder. The oxide powders collected in the bags or compartments are found to contain most of the lead and zinc, as well as from fifty to seventy-five per cent. of the silver and a small portion of the gold contained in the original ore. The cinder may now be smelted for silver and gold in the ordinary way. The volatile powders from said bags or compartments are mixed with fine cinder or any fine material that will not be altered in form or composition in the retort, sufficient to reduce the proportion of metallic zinc in the mixture to an amount not exceeding fifty to fifty-five per cent. of the mass. To this mixture is added crushed fuel to an amount equal to from forty to fifty per cent., by weight, of the mixture, and the whole is then charged into the well-known retort-furnace commonly used for the reduction of metallic zinc, the furnace being operated and the zinc drawn from the condensers in the usual way.

An essential part of the process is to so regulate the heat in the retort-treatment that the silver and gold, as well as the lead when there is any lead present, shall be left in the retorts. When the charge is exhausted, the residuum remaining in the retorts is found to contain from eight to ten per cent. of zinc and from seventy-five to eighty per cent. of the silver and almost all of the gold and lead contained in the retort-furnace charge. The residuum from the retort-furnace is then subjected to the smelting treatment usual in smelting for silver and gold.

I claim—

1. For the reduction of complex ores containing silver and gold, or either of these metals, in association with zinc, the process which consists, first, in calcining the ores to rid them of sulphur; second, treating the calcined ores in a Wetherill zinc-furnace to separate the zinc and some of the gold and silver from the original ores; third, smelting the cinder resulting from said furnace treatment in a furnace such as is commonly used in smelting for silver and gold; fourth, treating the powdered substances (condensed fumes) produced by said Wetherill furnace treatment in a retort-furnace commonly used for the reduction of metallic zinc, and, finally, subjecting the cinder from the said retort-furnace to the smelting treatment commonly employed in smelting for silver and gold, substantially as set forth.

2. For the reduction of complex ores containing silver and gold, or either of these metals, in association with zinc, the process which consists, first, in treating the ores in a Wetherill zinc-furnace to separate the zinc and some of the gold and silver from the original ores; second, smelting the cinder from said furnace treatment in a furnace such as is commonly used in smelting for silver and gold; third, treating the powdered substances (condensed fumes) produced by said Wetherill-furnace treatment in a retort-furnace commonly used for the reduction of metallic zinc, and, finally, subjecting the cinder from the furnace last mentioned to the smelting treatment commonly employed in smelting for silver and gold, substantially as set forth.

WILLIAM C. WETHERILL.

Witnesses:
POPE YEATMAN,
H. G. PACKER.